(12) United States Patent
Leroy (10) Patent No.: US 7,577,603 B2
(45) Date of Patent: Aug. 18, 2009

(54) METHOD AND SYSTEM FOR SECURITY CERTIFICATE HOLDERS TO TAKE REMOTE DECISIONS DURING OPERATIONS CONCERNING SAID SECURITY CERTIFICATES

(76) Inventor: Pierre-Henri Leroy, 24 rue du Champs de Mars, F-75007 Paris (FR)

( * ) Notice: Subject to any disclaimer, the term of this patent is extended or adjusted under 35 U.S.C. 154(b) by 1145 days.

(21) Appl. No.: 10/416,195

(22) PCT Filed: Nov. 6, 2001

(86) PCT No.: PCT/FR01/03424

§ 371 (c)(1),
(2), (4) Date: May 6, 2003

(87) PCT Pub. No.: WO02/37204

PCT Pub. Date: May 10, 2002

(65) Prior Publication Data

US 2004/0044612 A1 Mar. 4, 2004

(30) Foreign Application Priority Data

Nov. 6, 2000 (FR) .................................. 00 14161
Feb. 20, 2001 (FR) .................................. 01 02251

(51) Int. Cl.
*G06Q 40/00* (2006.01)
(52) U.S. Cl. ........................... 705/37; 705/35; 705/36 R
(58) Field of Classification Search .................. 705/35, 705/37, 36
See application file for complete search history.

(56) References Cited

U.S. PATENT DOCUMENTS 4,674,044 A * 6/1987 Kalmus et al. ................ 705/37
5,497,317 A * 3/1996 Hawkins et al. ............... 705/37
6,029,146 A * 2/2000 Hawkins et al. ............... 705/35

(Continued)

FOREIGN PATENT DOCUMENTS

WO WO99/46658-A21 9/1999

(Continued)

OTHER PUBLICATIONS

Bagshaw J.F.G, Pratical Banking, Sir Isaac Pitman & Sons, LTD. 1924. pp. 146-147.*

(Continued)

*Primary Examiner*—James P Trammell
*Assistant Examiner*—Jamie H Swartz
(74) *Attorney, Agent, or Firm*—Fulbright & Jaworski L.L.P.

(57) ABSTRACT

The invention concerns a system enabling remote security certificate holders of a company to take decisions concerning security operations proposed by the company. The system uses a computer communication network and distinguishes between registered owners and bearer securities holder. In the case of a registered owner, an identification code generated by a centralizing unit is returned by the holder to the centralizing unit directly and in parallel via a depository. In the case of a bearer securities holder, an identification key generated by a collecting agent is transmitted directly and in parallel via a depository. The holder transmits his identifiers and his decisions to the collecting agent who forwards them partly, in parallel, via the depository to a centralizing unit. The centralizing unit compares the codes or identification keys for the purpose of executing the decisions of the holders.

9 Claims, 6 Drawing Sheets

U.S. PATENT DOCUMENTS

| | | | |
|---|---|---|---|
| 6,161,099 A * | 12/2000 | Harrington et al. ......... | 705/36 R |
| 6,195,647 B1 * | 2/2001 | Martyn et al. ............. | 705/36 R |
| 6,233,566 B1 * | 5/2001 | Levine et al. ............. | 705/36 R |
| 6,311,190 B1 * | 10/2001 | Bayer et al. .............. | 707/104.1 |
| 6,317,728 B1 * | 11/2001 | Kane ........................ | 705/36 R |
| 7,143,060 B2 * | 11/2006 | Foster et al. ................. | 705/35 |
| 7,158,951 B2 * | 1/2007 | Stark .......................... | 705/37 |
| 2001/0037234 A1 * | 11/2001 | Parmasad et al. ............ | 705/12 |
| 2004/0059646 A1 * | 3/2004 | Harrington et al. ........... | 705/27 |

FOREIGN PATENT DOCUMENTS

| | | |
|---|---|---|
| WO | WO00/75828 A1 | 12/2000 |

OTHER PUBLICATIONS

Ryan Lackey, et al., "Third International Conference on Financial Cryptography (FC '99)", www.ieee-security.org., 'Online!, Feb. 22-25, 1999, pp. 1-20.

Michael Markowitz, "Shareholder voting via Internet gaining", The Record Online, 'Online!, Jan. 6, 1999, pp. 1-2.

Mark Wigmans, "Shell project", www.xs4all.nl. 'Online!, Dec. 3, 1999.

"Shareholder Services", PSINET, 'Online!, Mar. 14, 2000, p. 1.

* cited by examiner

FIG_2

FIG_3

FIG_4

FIG_6

METHOD AND SYSTEM FOR SECURITY CERTIFICATE HOLDERS TO TAKE REMOTE DECISIONS DURING OPERATIONS CONCERNING SAID SECURITY CERTIFICATES

FILED OF THE INVENTION

The present invention relates to a method and a system enabling security holders to make decisions or instructions during operations affecting these securities.

DEFINITIONS OF THE INVENTION

Within the meaning of the present invention, "decisions or instructions" refers to decisions or instructions formulated by a security holder in response to a trade offer concerning the securities (for example: transfer or retain in the case of an exchange offer, sell the securities or retain them in the case of a purchase offer, purchase or apply for shares in the case of subscription or exercise subscription rights or the option for dividend shares, etc.)

Within the meaning of the present invention, "security order" refers more generally to any instruction given by the security holders concerning the securities they hold, either in response to an offer or an external event (decisions or instructions) related to either the purchase, sale, blocking, application, or communication of the number of securities held.

BACKGROUND OF THE INVENTION

Currently, the decisions or instructions during operations affecting securities or security orders for holders of securities of a quoted company (the issuer) are executed by transmitting documents via the postal service and, for the most part, by intermediary of financial depository institutions. The sending and receiving of security orders involves several depositories (banks, stock brokering companies) in France and abroad, and several methods of transmission.

The current operating method is thus characterized by the cumbersome nature of document exchanges, often paper, and by the difficulty experienced by the issuers involved in inviting distant or unidentified holders to respond to security offers.

French law makes a distinction between the registered security holder, who has legally or voluntarily accepted to allow his name and contact information to be made known to the issuing company, and the bearer security holder, whose identity can be known only through performing a costly search initiated by the issuer and with a result that is always incomplete. The number of securities held by the bearer security holder and his identity are in fact only known upon his initiative, for example during the receipt by the issuer of a security order concerning, for example, a request to block the shares that will be addressed to his depository.

Although the decisions or instructions transmitted via Internet during the security orders are easily incorporated into the relationship between the issuer and the registered owners known at the outset and to whom a confidential identifier has been sent, it is different for the decisions or instructions of the bearer security holders, who are unknown to the issuer. To be valid, their decisions or instructions must wait to be verified by the banker, the final centralizing unit generally belonging to an organization responsible for the registration of or the compensation for securities (in France, EUROCLEAR).

It should be noted that remote decisions or instructions require the transmission via mail of a form for a decision or instruction by a depository network. The depositories in the network, including the last element of the network, the centralizing unit, validate the response to a security offer which comprises two elements: the number of securities held and the decisions or instructions proposed to and duly selected by the holder. The centralizing unit is generally a member of an institution responsible for the recording of or the payment for securities.

OBJECT AND SUMMARY OF THE INVENTION

The present invention relates to a method and a system enabling the stated problem to be resolved.

The method according to the invention enables remote holders of securities of a company to make decisions or to transmit instructions during a security trade affecting the securities. The trade is offered to security holders in an offer by a third party or by the company, in particular during an offer to buy or exchange securities. The third party or the company is hereinafter referred to as the issuer of the offer.

The method according to the invention implements a computer communication network, in particular of the Internet type. The administration of decisions or instructions is provided by the issuer of the offer and/or by an entity, in particular a financial institution, hereinafter referred to as the centralizing unit.

The method according to the invention is implemented in one or both of the following cases:

Case in which the Registered Security Holders Have Communicated Their Names and Their Contact Information to the Company In this case, the registered security holders have deposited the registered securities with a financial institution hereinafter referred to as the financial depository institution.

In this case, the method according to the invention comprises the step, for the issuer of the offer and/or for the centralizing unit, of generating and transmitting to the registered security holder a confidential identification code. The method according to the invention also comprises the step, for the registered security holder, of identifying himself by transmitting to a collecting agent, via the computer network, personal identifiers, decisions, or instructions concerning the proposed security trade, as well as the confidential identification code. The method according to the invention also comprises the step, for the collecting agent, of recording the personal identifiers, the decisions or instructions concerning the proposed security trade, as well as the confidential identification code. The method according to the invention also comprises the step, for the collecting agent, of transmitting to the centralizing unit, via the computer communication network, the personal identifiers, the decisions or instructions concerning the security trade, as well as the confidential identification code. The method according to the invention also comprises the step, for the collecting agent, of generating and transmitting to the depository via the computer communication network a message containing the security orders accompanied by the statement of the number of securities involved and the confidential identification code.

The method according to the invention also comprises the step, for the depository, of transmitting to the centralizing unit the name of the registered security certificate holder, the number of securities held by the registered security certificate holder, the orders for securities, and the confidential identification code (6c).

The method according to the invention also comprises the step, for the centralizing unit, of executing the orders for securities related to the security trade for which the identification code received from the collecting agent and the identification code received from the depository are identical to the identification code generated, and of linking with the decision or instruction concerning the security trade the orders for securities and the number of securities held by the registered security holder.

Case of Bearer Securities

In this case, the bearer securities are deposited with a financial institution hereinafter referred to as the financial depository institution. The method according to the invention in this case comprises the step, for the bearer securities holder, of transmitting via the computer communication network the personal identifiers as well as the decisions or instructions concerning the security trade to a collecting agent whom the bearer security holder has designated as the financial depository institution. The method according to the invention also comprises the step, for the collecting agent, of recording the personal identifiers as well as the decisions or instructions concerning the security trade. The method according to the invention also comprises the step, for the collecting agent, of generating and linking an identification key to the decisions or instructions concerning the security trade. The method according to the invention also comprises the step, for the collecting agent, of transmitting to the centralizing unit, via the computer communication network, the personal identifiers as well as the decisions or instructions concerning the security trade and the corresponding identification key. The method according to the invention also comprises the step of generating and transmitting to the depository, via the computer communications network, a message containing the security orders, accompanied by the statement of the number of securities involved and the identification key. The method according to the invention also comprises the step, for the depository, of transmitting to the centralizing unit the name of the bearer security holder, the number of securities held by the bearer security holder, the security orders, and the identification key. The method according to the invention also comprises the step, for the centralizing unit, of executing the security orders concerning the security trade for which the identification key received from the collecting agent is identical to the identification key transmitted by the depository, and linking the securities orders and the number of bearer securities to the decisions or instructions.

According to one version of an embodiment of the invention, the issuer assumes responsibility for least part of the services implemented by the centralizing unit.

The invention further relates to a system enabling remote holders of securities of a company to make decisions or to transmit instructions during a security trade affecting the securities. The trade is proposed to security certificate holders in an offer by a third party or by the company, in particular during an offer to purchase or exchange securities. The third party or the company is hereinafter referred to as the issuer of the offer. The administration of decisions or instructions is provided by the issuer and/or by an entity, in particular a financial institution hereinafter referred to as the centralizing unit. The system according to the invention implements a computer communication network, in particular of the Internet type.

The system according to the invention is implemented in one or both of the following cases:

Case in which the Registered Security Holders Have Communicated their Names and their Contact Information to the Company In this case, the registered security holders have deposited the registered securities with a financial institution hereinafter referred to as the financial depository institution.

In this case, the system according to the invention comprises a means of calculation and a means of transmission used by the issuer or by the centralizing unit to generate and transmit to the registered security holder a confidential identification code. The system according to the invention in this case also comprises computer equipment used by the security holder to transmit to a collecting agent-server, via the computer network, personal identifiers, decisions or instructions, as well as the confidential identification code. The collecting agent-server comprises means for recording the personal identifiers, the decisions or instructions, as well as the confidential identification code. The collecting agent server also comprises means of transmission to transmit to a collecting agent-server used by the centralizing unit, via the computer communication network, the personal identifiers, the decisions or instructions, as well as the confidential identification code. The collecting agent-server comprises means of transmission for generating and transmitting to the depository, via the computer communication network, a message comprising security orders accompanied by the statement of the number of securities involved and of the confidential identification code.

The depository has means of transmission for transmitting to the centralizing unit the name of the registered security holder, the number of securities held by the registered holder, the security orders, and the confidential identification code.

The collecting agent-server comprises means of execution for executing the security orders for which the identification code received by the collecting agent server and the identification code received from the depository are identical to the identification code generated, and for linking to the decisions or instructions the security orders and the number of securities held by the registered holder.

Case of Bearer Securities

In this case, the bearer securities are deposited with a financial institution hereinafter referred to as the financial depository institution. In this case, the system according to the invention comprises computer equipment used by the security holder for transmitting to a collecting agent-server, via the computer communication network, the personal identifiers, the decisions or the instructions, as well as the contact information of the financial depository institution. The collecting agent-server comprises means of recording for recording the personal identifiers, and the decisions or instructions. The collecting agent-server also comprises a first means of data processing for generating and linking an identification key to the decisions or instruction. The collecting agent-server also comprises a first means of transmission for transmitting to a collecting agent server, via the computer communication network, the personal identifiers, the decisions or instructions, as well as the corresponding identification key. The collecting agent-server also comprises a second means of data processing for generating and transmitting to the depository, via the computer communication network, a message containing the security orders accompanied by the statement of the number of securities involved and the identification key.

The depository has means of transmission for transmitting to the issuer or to the centralizing agent the name of the bearer security holder, the number of securities held by the bearer security holder, the security orders, and the identification key.

The collecting agent-server comprises means of execution for executing the security orders for which the identification key received from the collecting agent server is identical to the identification key transmitted by the depository, and for linking the security orders and the number of securities to the bearer to the decisions or instructions.

According to one version of the embodiment of the invention, the issuer assumes responsibility for at least part of the functions exercised by the centralizing unit.

The invention further relates to a server enabling remote holders of the securities of a company to make decisions or to transmit instructions during a security trade affecting the securities. The trade is proposed to the security holders in an offer by a third party or by the company, in particular during an offer for purchase or exchange of securities. The third party or the company is hereinafter referred to as the issuer of the offer. The administration of the decisions or of the instructions is provided by the issuer and/or by an entity, in particular a financial institution, hereinafter referred to as the centralizing unit. The server is connected to a computer communication network, particularly of the Internet type.

The server is implemented in one and/or both of the following cases:

Case in which the Registered Security Certificate Holders Have Communicated Their Names and Contact Information to the Company In this case, the registered security holders have deposited the registered securities with a financial institution hereinafter referred to as the financial depository institution.

In this case, the issuer of the offer and/or the centralizing unit have generated or transmitted to the registered security holder a confidential identification code. The security holder has transmitted to the server, via the computer network, the personal identifiers, the decisions or the instructions, as well as the confidential identification code.

In this case, the server according to the invention also comprises means of recording for recording the personal identifiers, the decisions or instructions, as well as the confidential identification code. The server according to the invention also comprises means of transmission for transmitting to the centralizing unit-server used by the centralizing unit, via the computer communication network, the personal identifiers, the decisions or instructions, as well as the confidential identification code.

The server according to the invention also comprises means of transmission for generating and transmitting to the depository, via the computer communication network, a message containing the security orders accompanied by the statement of the number of securities involved and the confidential identification code.

The depository transmits to the centralizing unit the name of the registered security holder, the number of securities held by the registered security holder, the security orders, and the confidential identification code.

The centralizing unit executes the security decisions for which the identification code received from the server and the identification code received from the depository are identical to the identification code generated, and links to the decisions or instructions the security orders and the number of securities held by the registered security holder.

Case of Bearer Securities

In this case, the bearer securities are deposited with a financial institution hereinafter referred to as the financial depository institution. The security holder transmits to the server, via the computer network, personal identifiers, decisions or instructions, as well as the contact information of the financial depository institution.

In this case, the server according to the invention comprises means of recording for recording the personal identifiers, and the decisions or instructions. The server according to the invention also comprises means of data processing for generating and linking an identification key to the decisions or instructions. The server according to the invention also comprises a first means of transmission for transmitting to a centralizing unit-server used by the centralizing unit, via the computer communication network, the personal identifiers, the decisions or instructions, as well as the corresponding identification key. The server according to the invention also comprises a second means of data processing for generating and transmitting to the depository, via the computer communication network, a message containing the security orders accompanied by the statement of the number of securities involved and the identification key.

The depository transmits to the issuer or to the centralizing unit the name of the bearer security holder, the number of securities held by the bearer security holder, the security orders, and the identification key.

The centralizing unit executes the security orders for which the identification key received from the server is identical to the identification key transmitted by the depository, and links the security orders and the number of bearer securities to the decisions or instructions.

According to one version of the embodiment of the invention, the issuer assumes responsibility for at least part of the functions exercised by the centralizing unit.

DESCRIPTION OF THE FIGURES

Other characteristics and advantages of the invention become apparent upon reading the description of versions of the embodiment, given for purposes of example which are non-restrictive, and by the following FIGS. 1-3.

The versions of the embodiment given for purposes of example which are non-restrictive, by referring to FIGS. 4 through 6 mentioned below, relate in particular to a method and a system enabling remote stockholders to vote electronically at meetings. The descriptions of FIGS. 1 through 6 follow.

DETAILED DESCRIPTION OF THE EMBODIMENTS

Figure 1:
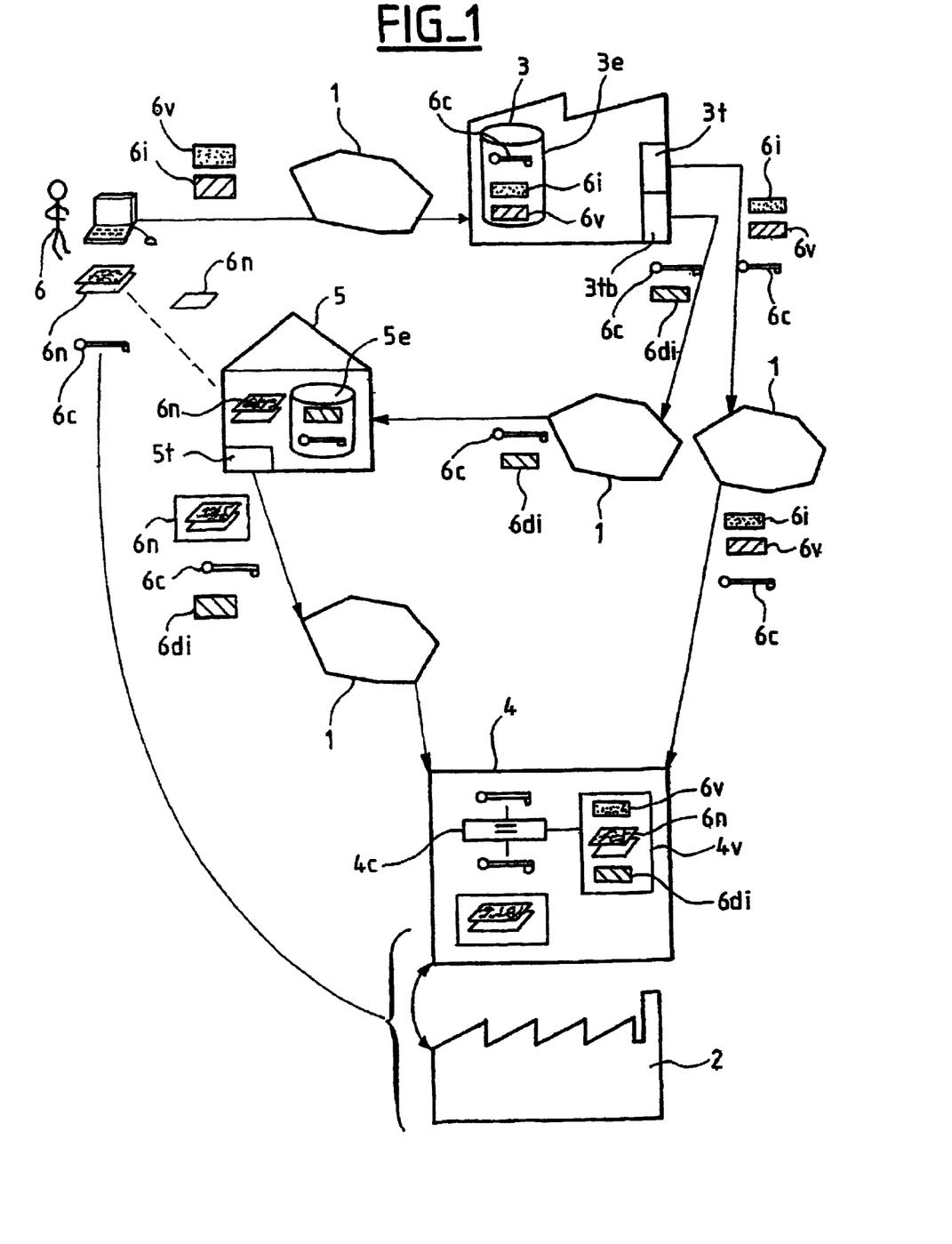
FIG. 1 is a schematic representation for the case of a registered security holder, and the nature and the flow of various information which is exchanged between the security holder and the various servers and which is necessary for taking into consideration the decisions or the instructions of the security holder.

FIG. 1 is a representation of the case of a registered security holder, and the nature and the flow of various information which is exchanged between a security holder and the various servers and which is necessary for taking into consideration the decisions or the instructions of the security holder, during a security trade.

In the proposed version, registered security holder 6 is the holder of a certain number of securities 6n which he deposits with a depository 5 having means of recording 5e.

Before transmitting his decisions or instructions concerning the security trade, registered security holder 6 receives a confidential identification code 6c transmitted from a collecting agent-server 4 (or, optionally, from an issuer 2).

During the implementation of a security trade, security holder 6 transmits to a collecting agent-server 3, via a computer communication network 1, in particular an Internet-type computer communication network, his confidential code 6c, personal identifiers 6i, and decisions or instructions 6v concerning the security trade. Collecting agent-server 3 records this information in its recording system 3e. Collecting agent-server 3 is connected via a communication network 1, in particular an Internet-type computer communication network, to a collecting agent-server 4 (or, optionally, to issuer 2). By using its transmission devices 3t via network 1, collecting agent-server 3 transmits to collecting agent-server 4 of the centralizing unit institution the confidential code 6c, personal identifiers 6i, and decisions or instructions 6v of security holder 6.

In parallel, collecting agent-server 3 sends to depository 5, via computer network 1 and means of transmission 3tb, this confidential code 6c as well as a message containing security orders 6di.

Although the version of the embodiment described represents only a single depository, the present invention is equally applicable to the case of a chain of depositories.

Depository 5 records 5e the instructions sent to it by collecting agent-server 3 and by its means of communication 5t, via network 1, transmits to centralizing unit-server 4 confidential code 6c as well as security orders 6di, the information concerning the holder, and the number of securities 6n involved.

Collecting agent-server 4 compares, by means of a comparator 4c, confidential code 6c which it sent to security holder 6 (before he transmits his decisions or instructions) to the code received by collecting agent 3 and depository 5. The equivalence of these two codes received to the one generated by the centralizing unit enables security trades 6di to be executed by taking into consideration decisions or instructions 6v and personal identifiers 6i, security orders 6di, security orders 6di, and the number of securities 6n held.

Figure 2:
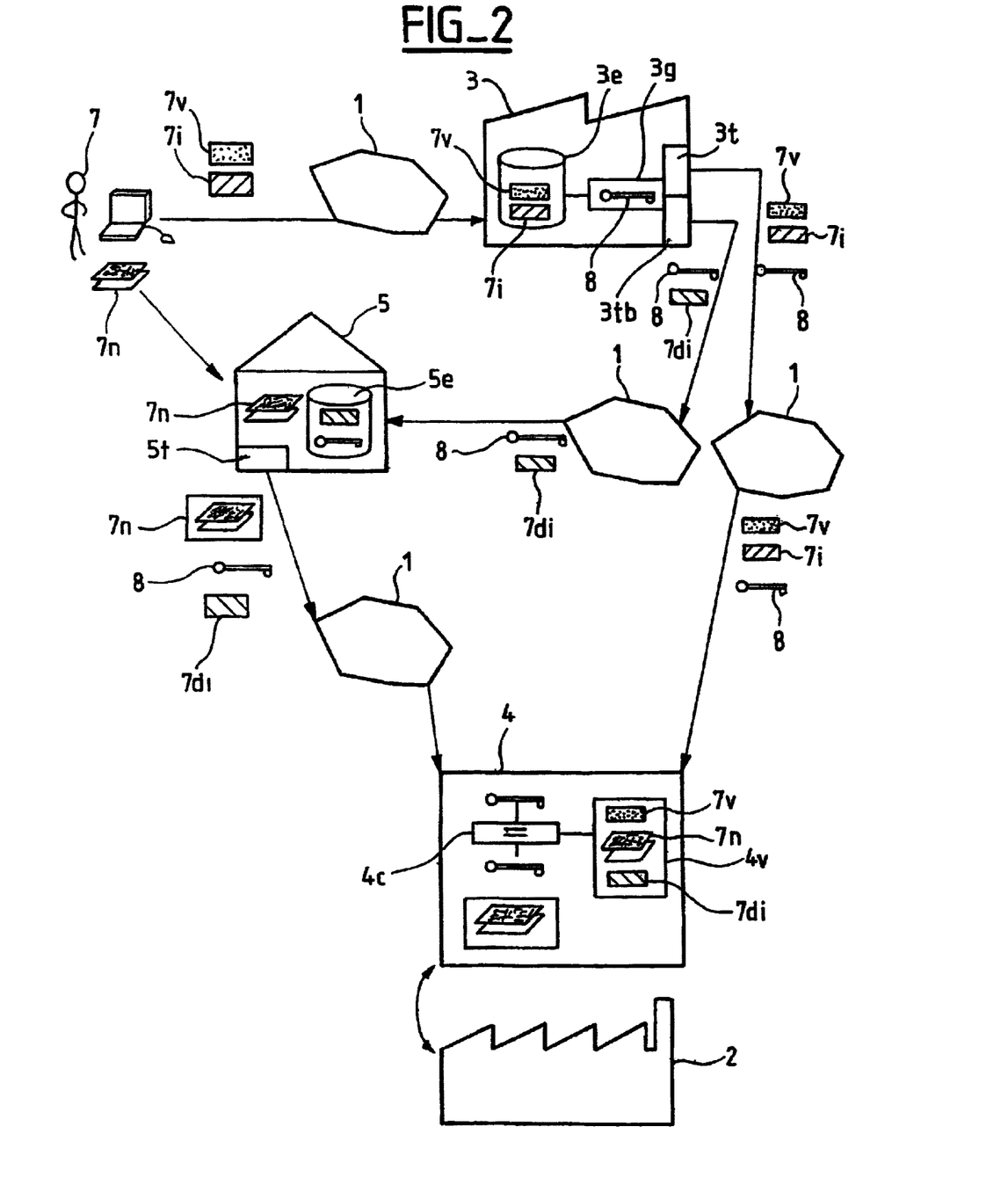
FIG. 2 is a schematic representation for the case of the bearer security holder, and the nature and the flow of various information which is exchanged between a security holder and the various servers and which is necessary for taking into consideration the decisions or the instructions of the security holder.

FIG. 2 is a representation of the case of a bearer security holder, and the nature and the flow of various information which is exchanged between a holder and the various servers and which is necessary for taking into consideration the decisions or the instructions of the holder, during a security trade.

The main feature of the invention is emphasized here. It involves the fact that the holder of securities, in particular bearer securities, is enabled to transmit decisions or instructions, via an Internet-type computer communication network, directly to the centralizing unit in response to an offer. This transmission precedes and duplicates the security orders that are transmitted to the depository institutions. The method consists of accelerating the chain of transmission for information and of making it secure by duplicating, for decisions or instructions 7v, security orders 7di and the number of securities 7n held by bearer security holder 7 and transmitted by one or several depositories 5.

In the proposed version, bearer security holder 7 holds a certain number of securities 7n that he deposits with a depository 5 having a means of recording Se. The method comprises holder 7 who wishes to make decisions or instructions concerning the security trade, sending to a collecting agent-server 3 from a collecting agent center, via an Internet network 1, his personal identifiers 7i and his decisions or instructions 7v concerning his number of securities 7n. As soon as this information is received, collecting agent-server 3 records the information in its recording system 3e, and by means of a specific module 3g generates an identification key 8 linked to the decisions or instructions. Collecting agent-server 3 sends to depository 5, via computer network 1 and means of transmission 3tb, this identification key 8 as well as a message containing security orders 7di.

Although the version of the embodiment described represents only one depository, the present invention is equally applicable to the case of a chain of depositories.

In parallel, by using another means of transmission 3t, collecting agent-server 3 sends to centralizing unit-server 4 of the centralizing unit the personal identifiers 7i, decisions or instructions 7v, and identification key 8.

Depository 5 records 5e the instructions sent to it by collecting agent-server 3 and by its means of communication 5t via network 1 transmits to centralizing unit-server 4 the identification key 8, security orders 7di, as well as information concerning the security holder and the number of securities 7n involved.

To take into consideration the decisions or instructions of holder 7, centralizing unit server 4 compares 4c identification key 8 coming from collecting agent-server 3 and from depository 5. In the case that these keys match, the centralizing unit executes 4v security orders 7di by comparing, for the appropriately identified holder 7i, decisions or instructions 7v received from collecting agent-server 3, security orders 7di, and the number of securities 7n involved, received from the depository. As this version demonstrates, the method and the system according to the invention enable complete independence to be maintained between the institution that validates the decision or instructions and the institution that is the depository for the securities for which it is responsible. This feature in particular characterizes the method according to the invention because these elements are usually traditionally the object of the same flow of transmission by the chain of depositories.

Thus, the method according to the invention retains, by amplifying and by making secure, the current process. In fact, the financial depository intermediaries always ensure a function in line with their fiduciary mission concerning the movements and security trades. In addition, a larger number of holders may respond to security offers. Lastly, the issuer (or the centralizing unit) knows earlier and more completely the decisions or instructions. Due to the receiving module which enables it to reconcile the decisions or instructions and the number of securities involved, the final result and the response to offers are made secure.

Figure 3:
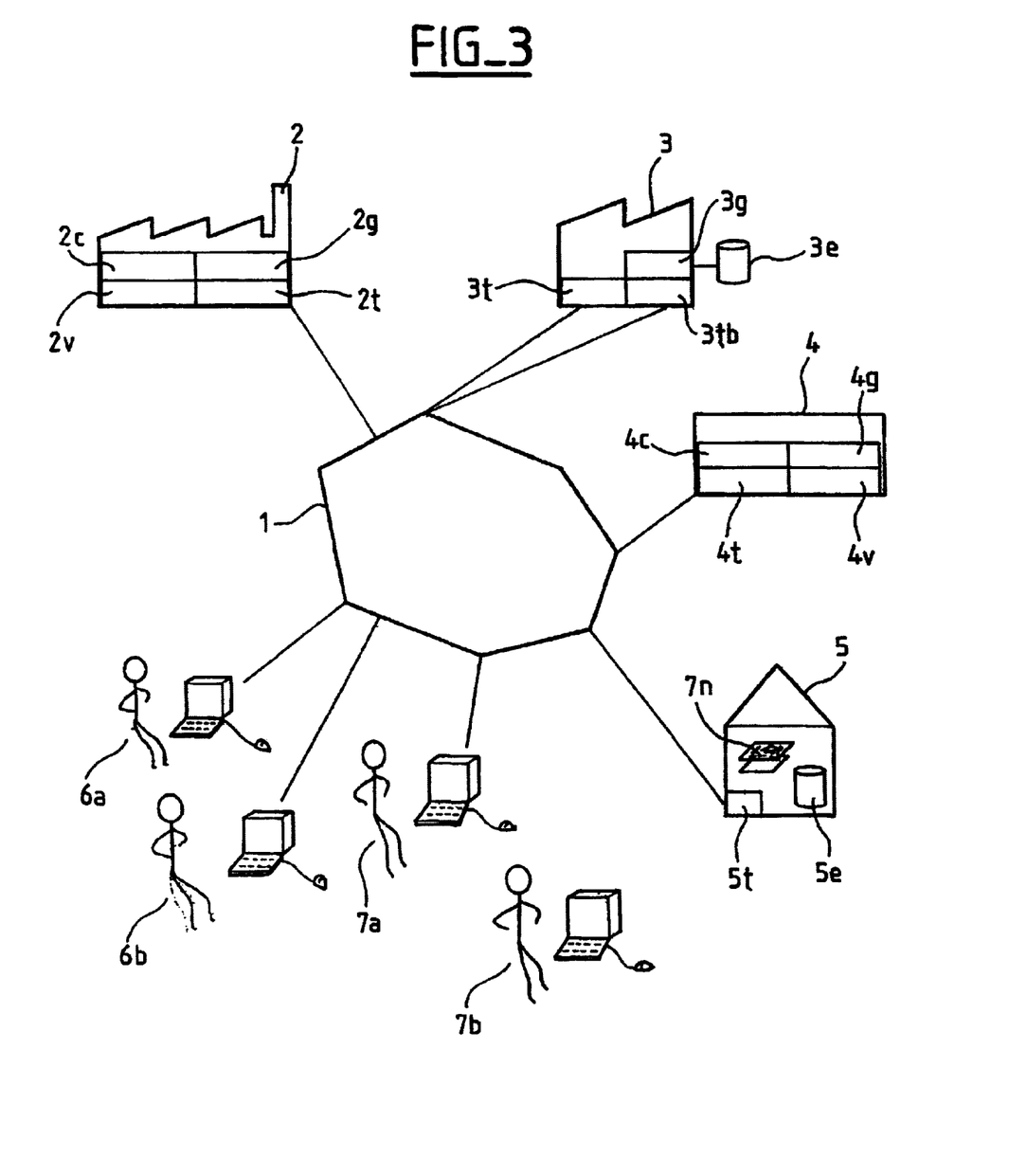
FIG. 3 is a representation of a general view of a version of the system and of the method according to the invention in the case of registered security holders and bearer security holders transmitting decisions or instructions by using an Internet-type computer communication network.

FIG. 3 is a representation of a general view of a version of the system and the method according to the invention in the case of registered holders 6a, 6b and bearer security holders 7a, 7b transmitting their decisions or their instructions concerning the security trades by means of an Internet-type computer network. The various servers of issuer 2, of collecting agent 3, of centralizing unit 4, and of depository 5 are connected to an Internet-type computer network. Registered holders 6a, 6b transmit via Internet network 1 various information that concerns them. This information is recorded, transmitted, compared, and executed by means of various corresponding systems 3e, 3t of collecting agent 3 and 4c, 4v, 4t of centralizing unit 4 and of depository 5. In the case of bearer security holders 7a, 7b, these are the servers for collecting agent 3 of centralizing unit 4 and of depository 5 which provide the decision or the instruction method. The information transmitted by holders 7a, 7b to collecting agent 3 is recorded in a module 3e, and an identification key 8 is generated by means of a module 3g. A first means of transmission 3t is used by collecting agent-server 3 to communicate the information to a centralizing unit server 4 of a centralizing unit center, and other information is transmitted to the depository center 5 by the collecting agent-server via transmission 3tb. Lastly, this figure shows the various means of recording Se and of transmission 5t for depository center 5, and means for comparison 4c of transmission 4t and execution 4v of centralizing unit-server 4 of the centralizing unit center.

Figure 4:
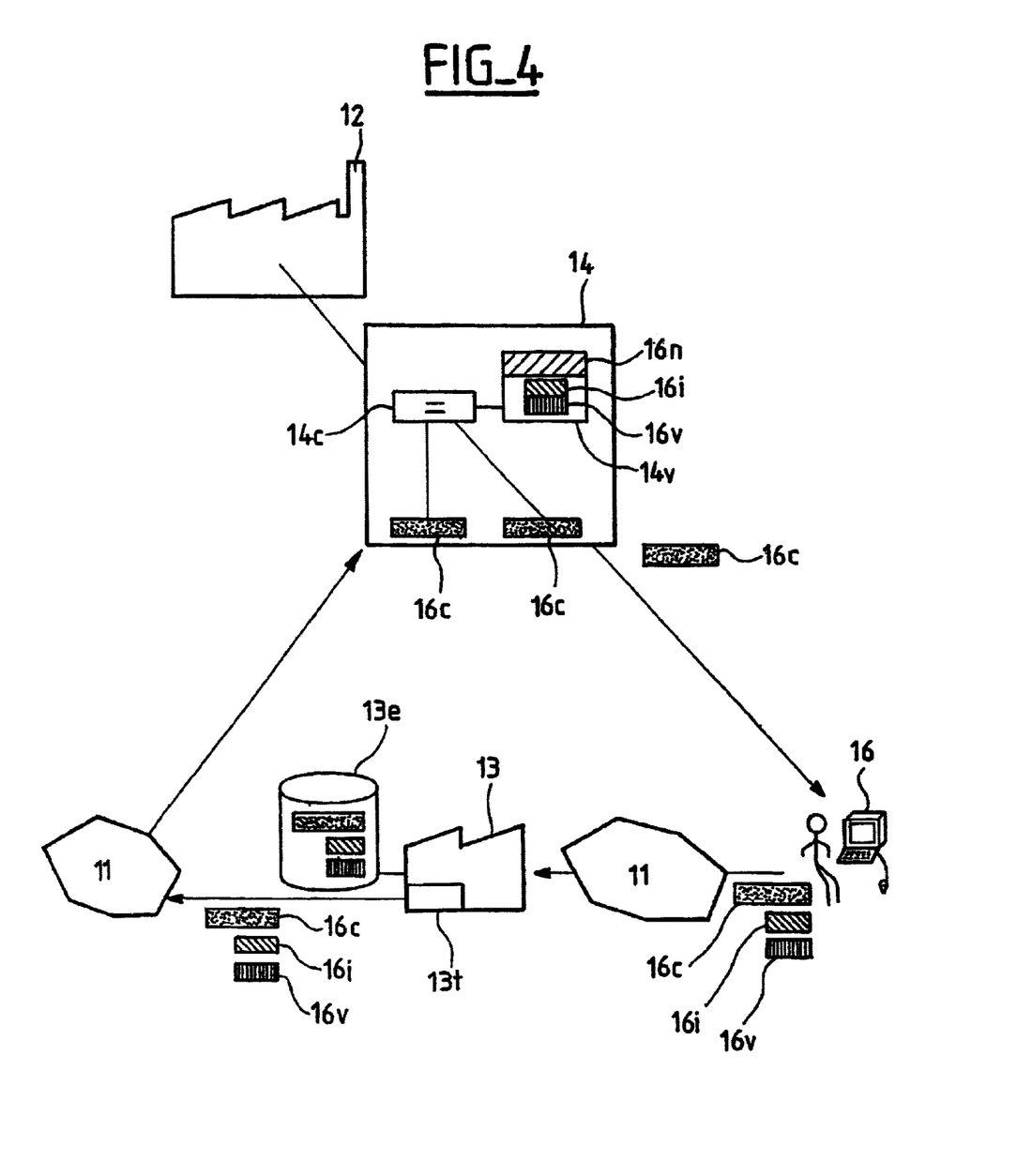
FIG. 4 is a schematic representation of the case for a registered stockholder, the nature and the flow of various information necessary for voting, and various exchanges between the various servers.
Figure 5:
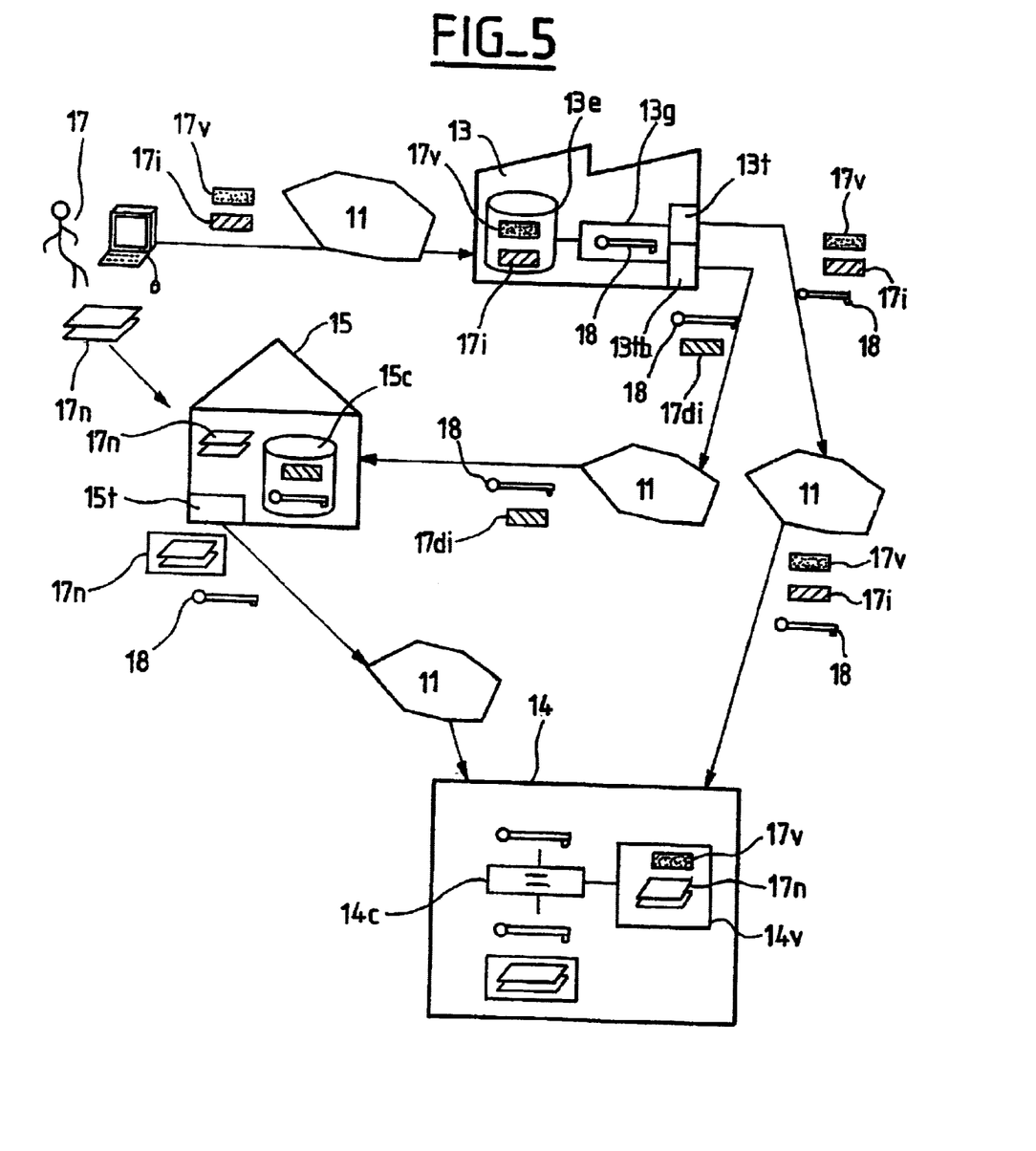
FIG. 5 is a schematic representation of the case for a bearer stockholder, the various information necessary for voting, and the various exchanges between the various servers.
Figure 6:
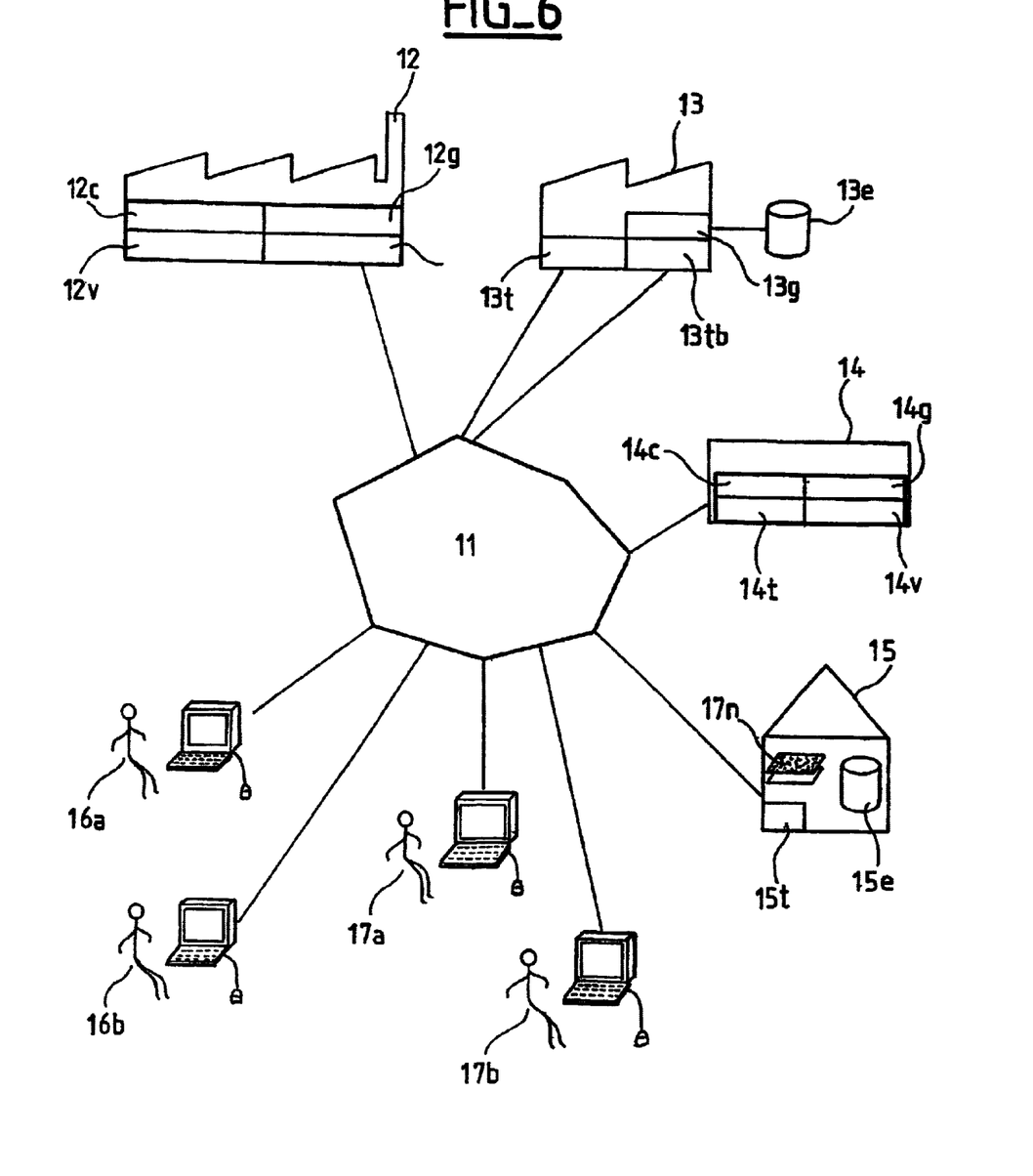
FIG. 6 is a representation of a general view of a version of the system and of the method according to the invention in the case of registered stockholders and bearer stockholders voting by using an Internet-type computer communication network.

The versions of the embodiment, given for the purposes of example which are non-restrictive, by referring to FIGS. 4 through 6, relate in particular to a method and a system enabling remote stockholders to vote electronically at meetings.

FIG. 4 is a representation of the case of a registered stockholder, the nature and the flow of various information necessary for voting, and exchanges between the various servers and a stockholder.

Collecting agent 13 and centralizing unit 14 (or, optionally, issuer 12) are connected through a computer network 11. Registered stockholder 16 receives, before his vote, a confidential identification code 16c transmitted from a centralizing unit 14 (or, optionally, from an issuer 12). During the voting, this stockholder 16 will transmit to collecting unit 13, via Internet network 11, his confidential code 16c, his personal identifiers 16i, and his voting instructions 16v. Collecting agent 13 will record this information in its recording system 13e. collecting agent 13 will then transmit, by means of its transmission devices 13t via network 11, to centralizing unit institution 14 confidential code 16c, personal identifiers 16i, and voting instruction 16v of stockholder 16. Centralizing unit 14 will compare 14c the confidential code which it sent to the stockholder before he votes to the one received from stockholder 16. The matching of these two codes enables validation 14v of the information concerning voting instructions 16v and identifiers 16i. Centralizing unit 14 then records the stockholder's vote thus identified, by taking into consideration his voting instructions 16v and by linking to his instructions the number of shares 16n that he holds.

FIG. 5 is a representation of the case of a bearer stock holder, the various information necessary for voting, and the various exchanges among the various servers.

One of the principal technical features of the invention is emphasized here. It involves the fact that, not only does it enable a vote by the stockholder, in particular for the bearer share holder, via an Internet-type computer network 11, but more particularly in such a way that the share depository institutions do not know how their shareholders voted. The method comprises unlinking, in the information chain of transmission, the number of shares 17 held by bearer share holder 17 from his voting instructions 17v.

In the proposed version, the bearer share holder is the holder of a certain number of shares 17n that he has deposited with a depository 15 having means of recording 15e. For shareholder 17 who wishes to vote, the method comprises sending his personal identifiers 17i and his voting instructions 17v concerning his number of shares 17n to a collecting agent center 13 by means of an Internet-type communication network 11. When this information is received, collecting agent center 13 records the information in its recording systems 13 and by means of a specific module 13g generates a voting identification key 18. The collecting agent center sends this voting key as well as a request to block shares 17di to depository 15 via computer network 11 and means of transmission 13tb. Although only one single depository is represented in the version of the embodiment described, the present invention is equally applicable to a chain of depositories.

This message thus contains only the voting instructions, which ensures that they will not be disclosed to the depository. In parallel, this collecting agent center 13 sends, via other means of transmission 13t, to centralizing unit 14 the personal identifiers 17i, voting instructions 17v, and voting identification key 18. The collecting agent center does not transmit the number of shares 17n involved.

Depository 15 has recorded 15e the instructions sent to it by the collecting agent center and transmits, by its means of communication 15t via network 11, to centralizing unit 14 the voting identification key 18 as well as the information concerning the shareholder and the number of shares 17n involved. To take into consideration the vote of shareholder 17, centralizing unit 14 must compare 14c voting key 18, and in the case that the keys match, it must validate 14v by comparing, for the clearly identified shareholder, voting instructions 17v received by the collecting agent, and the number of shares 17n concerned, received from the depository. As this version demonstrates, the method and the system according to the invention allow complete independence to be maintained by the institution that validates the votes and the institution that is the depository of the shares for which it is responsible. This feature in particular characterizes the method according to the invention because these elements are traditionally included together in the same paper voting form transmitted by the chain of centralizing units.

Thus, in sharp contrast to the current paper process, since the voting instructions of the shareholder clients are not disclosed to the financial depository intermediaries the latter provide only a function in line with their fiduciary mission, related to the holding of certificates and the possible blocking of shares as required by law. The voting results are disclosed only to the issuer (or the centralizing unit), because only they have the reception module enabling the reconciliation of the voting instructions and the number of shares involved.

FIG. 6 is a representation of a general view of a version of the system and the process according to the invention in the case of registered shareholders 16a, 16b and bearer shareholders 17a, 17b, voting by means of an Internet-type computer network 11. The various servers of issuer 12, collecting agent 13, centralizing unit 14, and depository 15 are connected to an Internet-type computer network 11. Registered share holders 16a, 16b will transmit via Internet network 11 the various information concerning them. This information will be recorded, transmitted, compared, and validated by means of various appropriate systems 13e, 13t of collecting agent 13 and 14c, 14v of centralizing unit 14. In the case of bearer shareholders 17a, 17b, the servers of collecting agent 13, centralizing unit 14, and depository 15 will provide the means for the voting procedure. The information transmitted by shareholders 17a, 17b to collecting agent 13 is recorded by a module 13e, and an identification key is generated by a module 13g. A first means of transmission 13t is used to communicate the information to a centralizing unit center 14, and other information is transmitted by means 13tb to depository center 15. Lastly, we see in this figure the various means for recording 15e and for transmission 15t for depository center 15, and means of comparison 14c and means of validation 14v of centralizing unit center 14.

The invention claimed is:

1. A method of enabling remote holders of securities of a company to transmit decisions/instructions in response to an offer of corporate action over a computer communications network, comprising the steps of:

generating and transmitting, by a centralized unit, said offer of corporate action and a confidential identification code to a holder of securities relating to said offer over said computer communications network, said holder of securities operating with a collecting agent;

recording, by said collecting agent, decisions/instructions and personal identifiers received from said holder of securities over said computer communications network, and additionally recording, by said collecting agent, said confidential identification code received from said holder of securities over said computer communications network if said holder of securities is a registered holder of securities;

generating an identification key for said holder of securities if said holder of securities is a bearer holder of securities and linking the decisions/instructions of said holder relating to said offer to said identification key of said holder of securities if said holder of securities is said bearer holder;

transmitting, by said collecting agent, the decisions/instructions and the personal identifiers of said holder of securities to said centralizing unit over said computer communications network;

transmitting, by said collecting agent, said confidential identification code of said holder of securities to said centralizing unit over said computer communications network if said holder of securities is said registered holder;

transmitting, by said collecting agent, said identification key of said holder of securities to said centralizing unit over said computer communications network if said holder of securities is said bearer holder;

generating and transmitting, by said collecting agent, a message containing the decisions/instructions of said holder of securities and a number of securities held by said holder of securities relating to said offer to a financial depository institution over said computer communications network if said holder of securities is said registered holder;

generating and transmitting, by said collecting agent, a bearer message containing a request to register, block for registration or transfer a number of securities held by said holder of securities relating to said offer to said financial depository institution over said computer communications network if said holder of securities is said bearer holder;

transmitting, by said collecting agent, the number of securities involved relating to said offer and deposited with the financial depository institution, and said identification key of said holder of securities to said centralizing unit over said computer communications network if said holder of securities is said bearer holder;

validating, by said centralizing unit, said registered holder and the decisions/instructions of said registered holder when said confidential identification code received from said registered holder matches said confidential identification code generated by said centralizing unit for said registered holder;

recording, by the centralizing unit, the decisions/instructions of said registered holder and linking the decisions/instructions of said registered holder with a number of securities held by said registered holder relating to said offer if said registered holder has been validated;

validating, by said centralizing unit, said bearer holder and the decisions/instructions of said bearer holder when said identification key of said bearer holder received from said collecting agent matches said identification key of said bearer holder received from said financial depository institution; and recording, by the centralizing unit, the decisions/instructions of said bearer holder and linking the decisions/instructions of said bearer bolder with a number of securities held by said bearer holder relating to said offer if said bearer holder has been validated.

2. The method of claim 1, wherein at least one of the steps of generating and transmitting a confidential identification code, and linking the decisions/instructions of said registered holder by said centralizing unit are partially performed by a-third-party or a company that issued said offer.

3. The method of claim 1, wherein the steps of generating and transmitting said offer of corporate action and linking the decisions/instructions of said bearer holder by said centralizing unit are partially performed by a third-party or a company that issued said offer.

4. The method of claim 1, wherein the corporate action is at least one of the following: an offer to participate in a general meeting and vote in response to a call of a company meeting; an offer to purchase or exchange a security in response to an offering from a third party or a company tat issued the offer.

5. A system for enabling remote holders of securities of a company to transmit decisions/instructions in response to an offer of corporate action over a computer communications network, comprising:

a centralizing unit under control of a financial institution for administering the decisions/instructions of holders of securities relating to said offer, and comprising a recording system and a processor for generating and transmitting to a holder of securities said offer of corporate action and a confidential identification code if said holder of securities is a registered holder of securities over said computer communications network;

a collecting agent sewer under control of a collecting agent, which administers the decisions/instructions of said holder of securities relating to said offer of corporate action; and a computer, under control of said holder of securities, for transmitting decision/instructions and personal identifiers of said holder of securities and additionally transmitting said confidential identification code if said holder of securities is said registered holder relating to said offer to said collecting agent server over said computer communications network; and wherein said collecting agent server comprises:

a recording system for recording the decisions/instructions and the personal identifiers of said holder of securities and additionally recording said confidential identification code if said holder of securities is said registered holder, a module for generating an identification key if said holder is a bearer holder of securities;

a processor for:

linking the decisions/instructions of said holder relating to said offer to said identification key if said holder of securities is a bearer holder;

generating a message containing the decisions/instructions and a number of securities held by said holder of securities relating to said offer if said holder of securities is said registered holder; and generating a bearer message containing a request to register, block for registration, or transfer a number of securities held by said holder relating to said offer if said holder of securities is said bearer holder; and a transmission device for:

transmitting the decisions/instructions and the personal identifiers of said holder to said centralizing unit over said computer communications network;

transmitting said confidential identification code to said centralizing unit and transmitting said message to a financial depository institution over said computer communications network if said holder of securities is said registered holder; and transmitting said identification key to said centralizing unit and said bearer message to said financial depository institution over said computer communications network if said holder of securities is said bearer holder; and wherein said centralizing unit is operable to receive a number of securities held by said holder of securities relating to said offer and said identification key if said holder of securities is said bearer holder from said financial depository institution over said computer communications network; and wherein said processor of said centralizing unit is operable to:

validate said registered holder and the decisions/instructions of said registered holder when said confidential identification code received from said registered holder matches said confidential identification code generated by said processor of said centralizing unit for said registered holder;

record the decisions/instructions of said registered holder in said recording system of said centralizing unit and link the decisions/instructions of said registered holder with the number of securities held by said registered holder relating said offer if said registered holder has been validated;

validate said bearer holder and the decisions/instructions of said bearer holder when said identification key of said bearer holder received from said financial depository institution matches said identification key of said bearer holder received from said processer of said collecting agent server; and record the decisions/instructions of said bearer holder in said recording system of said centralizing unit and link the decisions/instructions of said bearer holder to the number of securities held by said bearer holder relating to said offer if said bearer holder has been validated.

6. The system of claim 5, wherein said centralized unit further comprises an issuer server under control of an issuer of said offer for partially performing one or more functions of said centralized unit.

7. The system of claim 5, wherein said corporate action is at least one of the following: an offer to participate in a general meeting and vote in response to a call of a company meeting; an offer to purchase or exchange a security in response to an offering from a third party or a company that issued the offer.

8. A server connected to a computer communications network for enabling remote holders of securities of a company to transmit decisions/instructions in response to an offer of corporate action over said computer communications network, comprising:

a recording system for;

recording decisions/instructions and personal identifiers relating to said offer received from a holder of securities over said computer communications network; and recording a confidential identification code received from said holder of securities if said holder of securities is a registered holder of securities; and wherein said confidential identification code being generated and transmitted to said registered holder by a centralizing unit, which administers the decisions/instructions of holders of securities relating to said offer;

a processor for:

generating a message containing said confidential identification code, the decision/instructions and the number of securities held by said holder of securities relating to said offer if said holder of securities is said registered holder; and generating an identification key and linking the decisions/instructions of said holder of securities relating to said offer to said identification key if said holder is a bearer holder of securities; and generating a bearer message containing a request to register, block from registration or transfer a number of securities held by said holder of securities relating to said offer if said holder of securities is said bearer holder; and a transmission device for:

transmitting said message over said computer communications network to a depository, which receives the securities of said registered holder deposited with a financial depository institution if said offer involves transferring securities and transmits the number of securities held by said registered holder relating to said offer to said centralizing unit over said computer communications network;

transmitting the decisions/instructions, said confidential identification code and the personal identifiers of said registered holder to said centralizing unit over said computer communications network so that said registered holder can be validated by said centralizing unit when said confidential identification code transmitted to the centralizing unit matches the generated confidential identification code for said registered holder, and the decisions/instructions of said registered holder relating to said offer can be linked to the number of securities held by said registered holder relating to said offer by said centralizing unit;

transmitting said bearer message and said identification key of said bearer holder over said computer communications network to said depository, which receives the securities of said bearer holder deposited with said financial depository institution if said offer involves transferring securities and transmits said confidential identification code of said bearer holder and the number of securities held by said bearer holder to said centralizing unit over said computer communications network; and transmitting the decisions/instructions, the personal identifiers and said identification key of said bearer holder to said centralizing unit over said computer communications network so that said bearer holder can be validated by said centralizing unit when said identification key transmitted to said centralizing unit from said server matches the identification key transmitted to said centralizing unit from said depository, and the decisions/instructions of said bearer holder relating to said offer can be linked to the number of securities held by said bearer holder by said centralizing unit.

9. The server of claim 8, wherein the corporate action is at least one of the following: an offer to participate in a general meeting and vote in response to a call of a company meeting; an offer to purchase or exchange a security in response to an offering from a third party or a company that issued the offer.

* * * * *

UNITED STATES PATENT AND TRADEMARK OFFICE
CERTIFICATE OF CORRECTION

PATENT NO.         : 7,577,603 B2                          Page 1 of 1
APPLICATION NO.    : 10/416195
DATED              : August 18, 2009
INVENTOR(S)        : Pierre-Henri Leroy It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1590 days.

Signed and Sealed this

Seventh Day of September, 2010

David J. Kappos
*Director of the United States Patent and Trademark Office*